United States Patent [19]

Zezza et al.

[11] 4,436,693
[45] Mar. 13, 1984

[54] NON-IMPACTING LOOSE ROD STORAGE CANISTER

[75] Inventors: Louis J. Zezza, Ossining, N.Y.; Iqbal Husain, Brookfield, Conn.

[73] Assignee: Automation Industries, Inc., Greenwich, Conn.

[21] Appl. No.: 303,410

[22] Filed: Sep. 18, 1981

[51] Int. Cl.$^3$ ............................................. G21C 19/20
[52] U.S. Cl. .................................. 376/272; 250/507.1
[58] Field of Search .................... 376/272; 250/506.1, 250/507.1

[56] References Cited

U.S. PATENT DOCUMENTS

| | | | |
|---|---|---|---|
| 3,770,964 | 11/1973 | Backus | 250/506.1 |
| 4,042,828 | 8/1977 | Rubinstein et al. | 376/272 |
| 4,058,224 | 11/1977 | Jabsen | 376/272 |
| 4,139,778 | 2/1979 | Raymond | 376/272 |
| 4,203,038 | 5/1980 | Takahashi et al. | 376/272 |
| 4,233,518 | 11/1980 | Auyeung et al. | 376/272 |
| 4,236,969 | 12/1980 | Ljubivy et al. | 376/272 |
| 4,342,620 | 8/1982 | Vickrey | 250/507.1 |
| 4,356,062 | 10/1982 | Bosshard | 376/272 |

*Primary Examiner*—Sal Cangialosi
*Attorney, Agent, or Firm*—Francis N. Carten

[57] ABSTRACT

A canister for holding loose nuclear fuel rods for containment within a cell of a pool storage rack. The canister is designed with lateral restraints at both its bottom and its top to substantially prevent impact with the sides of the cell during an earthquake.

6 Claims, 6 Drawing Figures

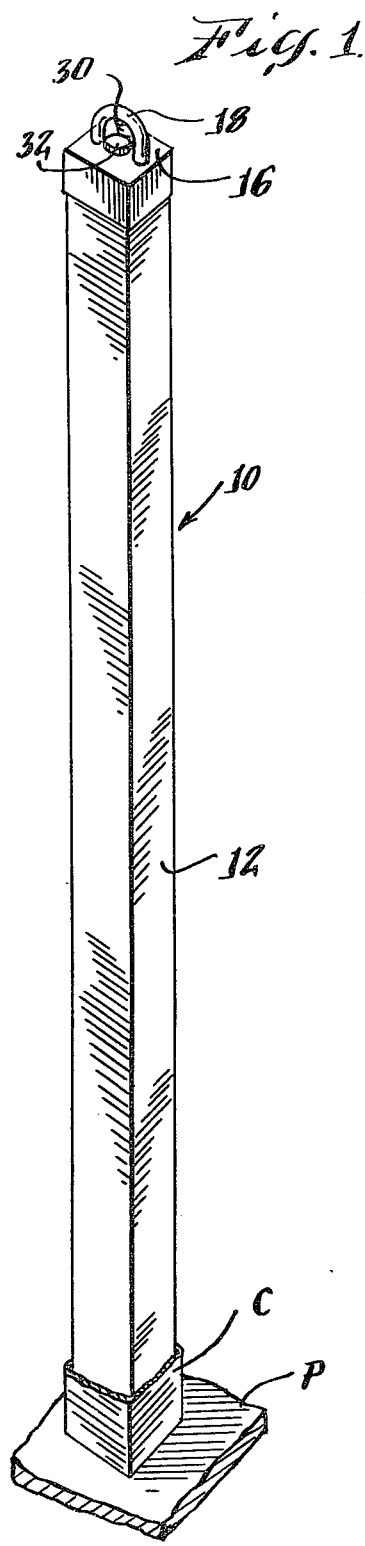
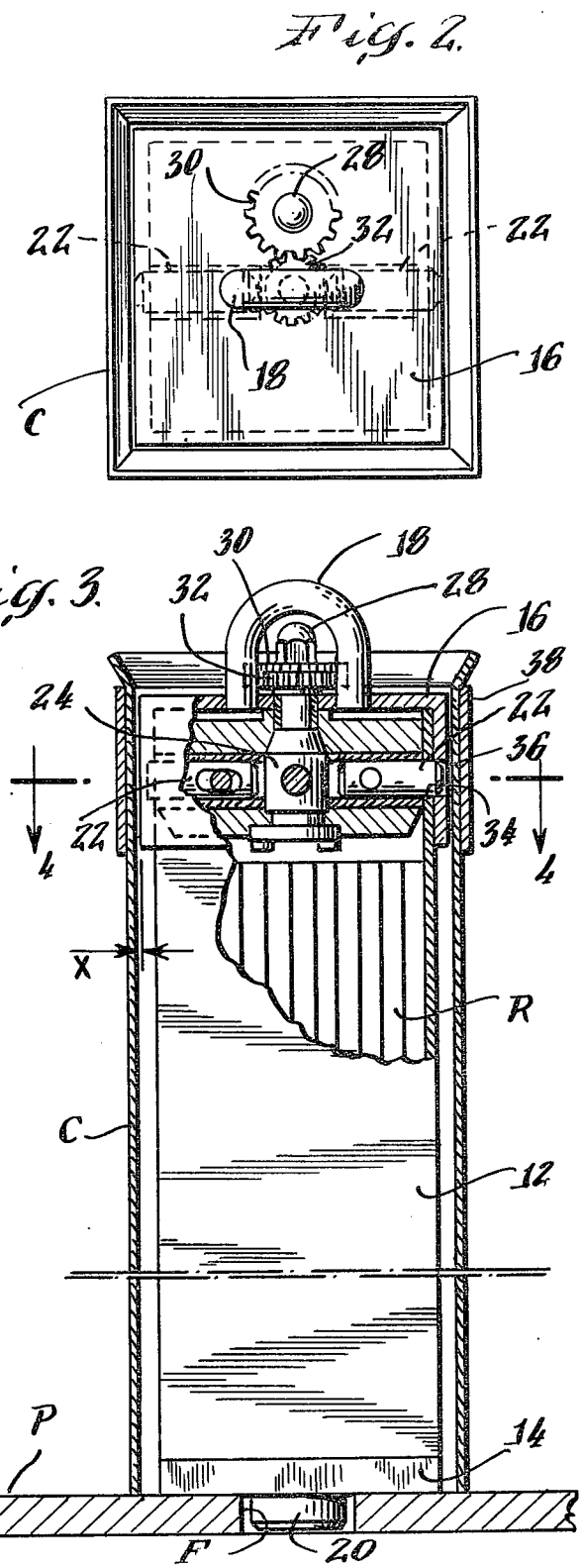

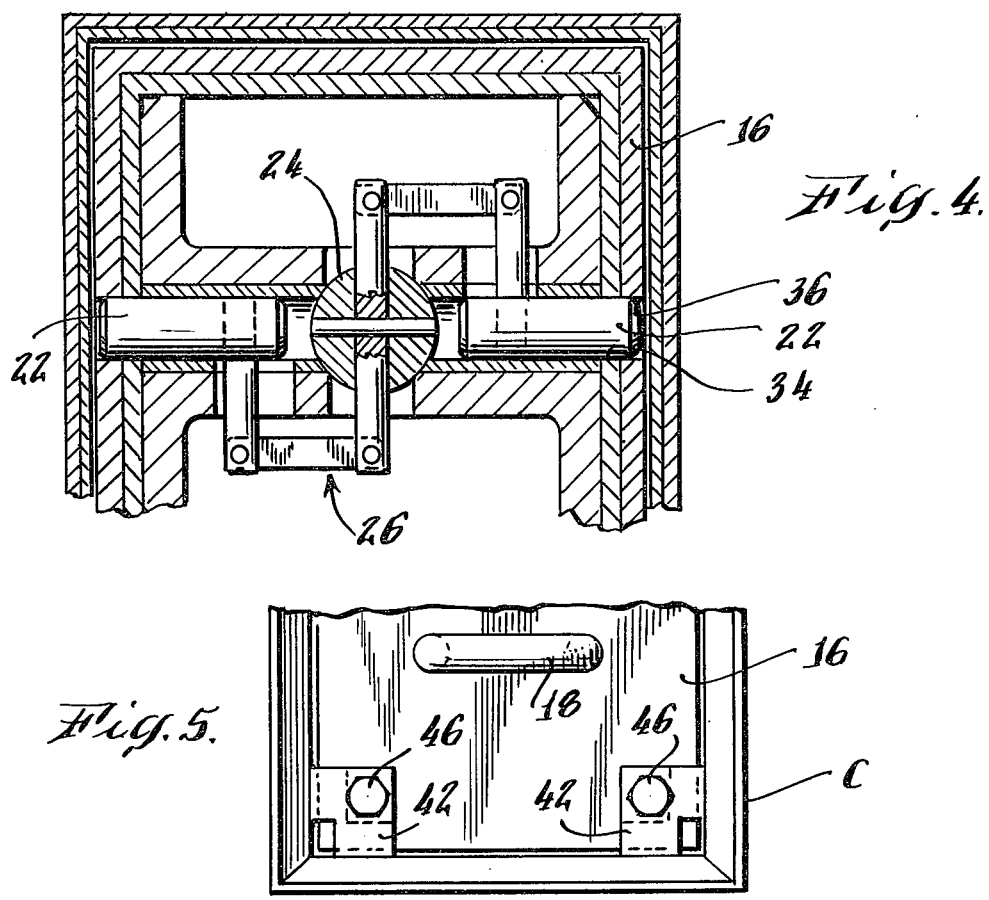

NON-IMPACTING LOOSE ROD STORAGE CANISTER

TECHNICAL FIELD

The field of this invention is the storage of spent nuclear reactor fuel rods.

BACKGROUND ART

It is conventional to store spent nuclear fuel assemblies in racks on the floor of a storage pool. It would, however, be desirable to increase the storage capacity of a rack. It has been proposed to achieve this by disassembling the rods from the fuel assembly in a remote area of the pool. This may be accomplished, for example, by cutting the top end fitting from the assembly and pulling out the fuel rods. The skeleton of the fuel assembly can then be compacted and disposed of in a commercial burial ground. The fuel rods would be loaded into a canister having approximately the same external dimensions as the fuel assembly. A cap would be sealed on the end of the canister and the canister lowered into a cell in the storage rack. As the rods can be close packed in the canister, it should be possible to achieve a compaction ratio of 1.5:1 to 2:1. In other words, the fuel rods of as many as two fuel assemblies may be stored in one cell of a fuel storage rack.

One problem which arises in implementing this concept is a result of the requirement that the rack must be designed to withstand a seismic event. A fuel assembly may weigh on the order of 1,500 pounds and there may typically be one-half inch clearance between the outside of the fuel assembly and the inner wall of a cell. For example, the cell may be 9 inches square and the fuel assembly may be 8½ inches square. In order to withstand an earthquake, the designer must employ an impact factor. This might be, for example, a factor of 2:1. Thus, for a 1,500 pound fuel assembly, the cell and rack would have to be designed to withstand a 3,000 pound load.

In going from fuel assembly storage to loose rod storage at 2:1 consolidation, 3,000 pounds of fuel rods may be placed in each cell. If impact is considered, the cells must be designed for a 6,000 pound load. However, if the impact factor can be disregarded and eliminated, redesign of the cells may be avoided.

It would also be desirable to reduce the horizontal seismic loads imposed by a rack on the pool floor.

DISCLOSURE OF INVENTION

It is an object of the present invention to provide a canister for storing loose, spent nuclear fuel rods within a fuel storage rack while substantially eliminating the impact factor under earthquake conditions.

In accordance with this invention, there is provided an elongated canister body of substantially square cross-section which has an open top end and a closed bottom end. The canister is dimensioned to fit within a storage cell of a fuel storage rack. A lateral support pin protrudes outwardly from the bottom end of the canister for containment within the flow hole of the bottom plate of the storage cell. A cap is secured on the open end of the canister and is arranged to avoid impacting against the sidewalls of the storage cell. Means are provided for securing the cap to the canister.

BRIEF DESCRIPTION OF DRAWINGS

FIG. 1 is a perspective view of one embodiment of a canister constructed in accordance with the present invention;

FIG. 2 is an enlarged top plan view of the canister of FIG. 1;

FIG. 3 is a front elevational view of the canister of FIG. 1, partially broken away to illustrate its internal construction;

FIG. 4 is an enlarged partial cross-section taken substantially along the line 4—4 of FIG. 3;

FIG. 5 is a partial top plan view of a modification of the canister of the invention; and FIG. 6 is a front elevational view of the upper portion of the canister of FIG. 5, partially broken away to illustrate its internal construction.

BEST MODE FOR CARRYING OUT THE INVENTION

There is illustrated in FIG. 1 a canister 10 constructed in accordance with the present invention. The canister is standing vertically as if in a pool storage rack. The bottom plate P of the storage rack is shown, but the cell C (illustrated in FIGS. 2 and 3) is substantially cut away. The canister is of stainless steel and has a main body 12 of square cross-section and dimensions approximating that of a nuclear fuel assembly. The bottom of the canister 10 is closed by a bottom wall 14 (FIG. 3) and the upper end is closed by a cap 16 having a lifting bail 18.

As previously explained, the canister will be substantially filled with nuclear fuel rods R and the filled canister may weigh, for example, 3,000 pounds. In order to store the filled canister in the cell C, which is designed for a load of 3,000 pounds, it is important to prevent impact in the event of an earthquake. In the present invention, this is achieved by means of lateral restraints at the top and at the bottom of the canister.

Restraint at the bottom of the canister is provided by a central, lateral support pin 20 which extends downwardly from the bottom wall 14 of the canister and into the flow hole F of bottom plate P. The lower end of the canister is thereby restrained so as to prevent impact with the sides of the cell C.

At the upper end of the canister, impact is substantially eliminated by reducing the clearance between the cap 16 and the wall of the cell C to a value sufficiently low that the upper portion of the canister cannot accelerate. This dimension, shown as x in FIG. 3, would be established in each case by a structural analyst but would probably be on the order of 0.030 inch with a maximum of 0.050 inch.

The cap 16 must be tightly secured or sealed to the canister body 12. This may be done in a number of ways but, in the illustrated embodiment, is achieved by a pair of horizontally opposed locking pins 22 driven by a rotating drive member 24 through a linkage 26, all as illustrated in FIG. 4. In order to avoid obstruction by the bail 18, the drive member 24 is actuated by an offset, hexagonally headed, locking lug 28 through gears 30, 32. When fully extended, as illustrated in FIGS. 3 and 4, the locking pins 22 extend through openings 34 in the body 12 of the canister and into aligned openings 36 in the cap 16.

Although the described construction substantially eliminates impact, there will still be some side loading at the top of the cell C. Accordingly, it may be desirable to strengthen the top of cell C by adding local reinforcement FIGS. 5 and 6 illustrate a modification of the invention whereby the need for maintaining a close tolerance gap at the top of the canister is eliminated. In this modification the cap 16 is provided with shimming means comprising tapered surfaces 40 adjacent at least two diagonal corners of the cap. At each such corner, there is inserted a double acting, right angle wedge 42. Each wedge has a body portion 44 which is connected to the cap 16 by means ob a bolt 46. Tapered surfaces 48 of each wedge engage the tapered surfaces 40 on the cap and the outer surfaces 50 of the wedge engage the sidewalls of cell C. After the loaded canister has been lowered into the cell C of the pool storage rack, the bolts 46 may be tightened, thereby driving the wedges downwardly so as to fixedly secure the upper end of the canister within the cell C.

It is believed that the many advantages of this invention will now be apparent to those skilled in the art. It will also be understood that many variations and modifications may be made in this invention without departing from its spirit and scope. Accordingly, the foregoing description is to be construed as illustrative only, rather than limiting. This invention is limited only by the scope of the following claims.

What is claimed is:

1. In combination with a nuclear fuel rod elongated storage cell having an open upper end, side walls, and a bottom wall formed with a central hole, a fuel rod canister contained within said cell comprising (a) an elongated body having an open upper end and a closed lower end,
   (b) a support pin extending downwardly from the closed lower end of the body and fitted within the central hole in the bottom wall of the cell to restrain the lower end of the body against lateral movement,
   (c) a cap on the open upper end of the body, and
   (d) means for securing the cap to the body,
   (e) the cap being closely spaced from and contained against substantial lateral movement by the side walls of the cell.

2. A canister according to claim 1 wherein the means for securing the cap to the body comprises locking pins movable through aligned openings in the body and the cap.

3. A canister according to claim 1 wherein the cell and the canister body are each of substantially square cross section.

4. A canister according to claim 1 wherein the clearance between the cap and the side walls of the cell is not in excess of 0.60 inch.

5. A canister according to claim 1 which includes a shimming wedge between the cap and the side walls of the cell for preventing lateral movement of the upper end of the body in the cell.

6. A canister according to claim 4 which further includes driving means for inserting said shimming wedge between said cap and the side walls of the cell, said driving means comprising a bolt interconnecting the cap and the wedge.

* * * * *